C. D. SEEBERGER.
PNEUMATIC TIRE.
APPLICATION FILED OCT. 1, 1913.
1,134,701.
Patented Apr. 6, 1915.
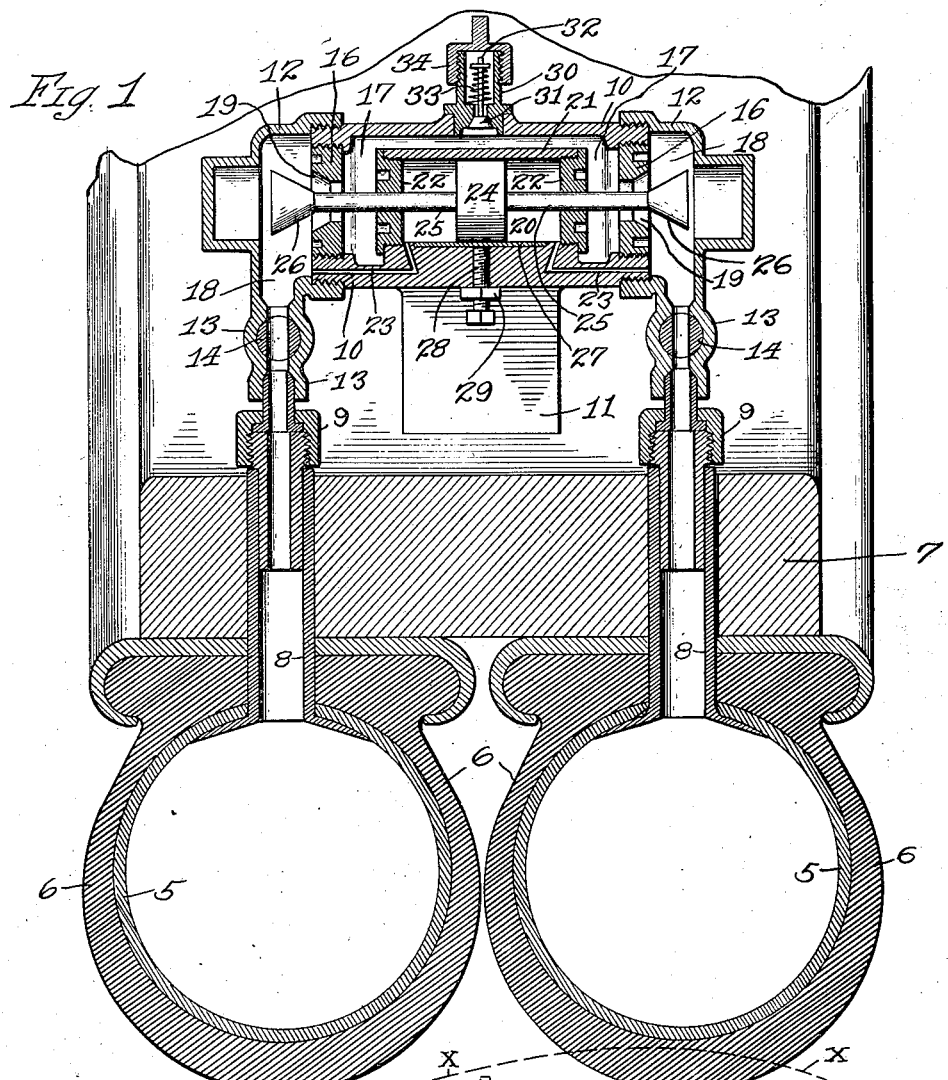
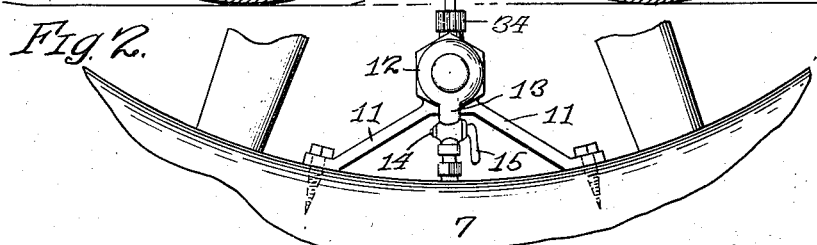
Witnesses:
L. B. Graham
Edith Wilcox
Inventor:
C. D. Seeberger
By J. M. Roberts
his Atty.

UNITED STATES PATENT OFFICE.

CHARLES D. SEEBERGER, OF NEW YORK, N. Y.

PNEUMATIC TIRE.

1,134,701. Specification of Letters Patent. Patented Apr. 6, 1915.

Application filed October 1, 1913. Serial No. 792,751.

*To all whom it may concern:*

Be it known that I, CHARLES D. SEEBERGER, a citizen of the United States, residing at New York, in the county of New York and State of New York, have invented certain new and useful Improvements in Pneumatic Tires, of which the following is a specification, reference being had therein to the accompanying drawing.

My invention relates to pneumatic tires for vehicles, and provides a structure comprising a plurality of collapsible tubes or containers arranged side by side to form the tire-portion of the vehicle wheel and inflated with air or other fluid when in use, and an equalizing valve connecting them whereby the air or other fluid may pass from either container or tube to the other when they are subjected to varying external pressures under the usual conditions of use such for example as are caused by a stone or the camber of a road, and in case of decrease of pressure in either tube or container as for example by puncture or blow-out the sound one will be sealed.

The invention consists in the matters herein disclosed and then pointed out in the appended claims.

In the drawings Figure 1 is a sectional view illustrating an embodiment of my present invention with a pair of automobile tires, and Fig. 2 is a side view of certain parts shown in Fig. 1.

In the drawings the reference numeral 5 indicates a pair of collapsible twin tubes or vessels to be inflated by air or other fluid and arranged side by side around the periphery of the wheel to form the tires for automobile wheels each provided with the usual outer shoe or casing 6 secured to the rim or felly 7 of the wheel by any suitable means. A stem 8 is fixed to each tube and projects up through the supporting member 7, where it is provided with a union 9 by which it is suitably connected to one end of the equalizing valve case. The valve case comprises a body 10 preferably circular in cross section supported on the inner face of the rim by legs or brackets 11, and provided at either end with a head 12 preferably adjustably attached to the body of the case and having a depending pipe 13 connected with the union 9 and provided with a stop cock 14 having a handle 15, the body and heads forming a closed chamber normally communicating with the tubes. The ends of the body of the case are provided with partition plates 16 which divide the interior chamber formed by the body and the heads into a central chamber 17 in the body of the case and end chambers 18 in the heads, and each plate 16 has a central passage 19 to afford communication between the central chamber in the body of the case and the chambers formed in the heads. A balancing chamber 20 is formed inside the body of the case and within the central chamber by means of a suitable curved partition 21 and end plates 22 having screw threaded engagement therewith, and each end of the balancing chamber is connected to the associated chamber 18 formed by one of the heads by means of a duct 23 forming a by-pass around the closure 16. A balanced piston 24 fits within the chamber 20 and is provided with opposite stems 25 in the axial line of the chambers and each passing through a passage 19 in a partition 16 where it is provided with a head or cone 26 forming a valve adapted to seat in and close the correspondingly shaped passage 19, the stems being of sufficient length so that in the normal positions of the parts both of the passages will be open. The interior of the balancing chamber 20 is provided with a sliding friction piece or packing 27 whereby friction on the balanced piston 24 is regulated by means of a screw 28 passing through the body of the case and provided with a set nut 29 to hold it in adjustable position. The upper portion of the case 10 is provided with a valved air inlet consisting of the usual nipple 30 having a valve seat closed by a valve 31 carried at one end of a stem 32 and held in place by means of a spring 33, the nipple being threaded to receive a closing cap 34.

When the tubes are subjected to approximately the same external pressure they will retain in general the same outline in cross section but when they are subjected to varying external pressures such as is caused by the camber of a road or a stone or other obstruction shown for example at X hit by one of the twin tubes a portion of the air or other fluid will pass from one tube to the other and cause the latter to bear a part of the additional burden which is thrown upon the first tube. The free passage of the air between the tubes is afforded by the balanced piston remaining in its neutral or central position by reason of the equality of pressure on its opposite sides through the ducts 23 from the two tubes 5 and the consequent opening of the passages 19 to afford free passage of air from one tube to the other. So long as both tubes remain whole the air will pass back and forth between them, but in case the pressure in one of the tubes fails or is reduced as for example by leakage or puncture or blow-out the communication between the tubes will be broken and the sound tube will be sealed and isolated by means of the action of the air upon the piston 21. In practice the piston is subjected to a predetermined friction by means of the plate 27 sufficient to represent a considerable resistance to motion and to hold the piston in balanced position against the action or pressure of the air upon the valves 26 as it may pass from one tube to the other under normal operating conditions, and so long as the frictional resistance on the piston is in excess of the difference between the pressures in the twin tubes there will be no movement of the piston, but in case the difference in these pressures becomes greater than the predetermined frictional resistance on the piston as in the event one of the tubes is punctured or blows out the drop in the pressure upon its side of the piston will cause the pressure upon the opposite side of the piston from the other inflated tube through its associated duct 23 to move the piston to cause the corresponding valve 26 to close the passage 19 on the high pressure side thereby sealing and isolating the sound tube. For example, if it be assumed that the left hand tube in Fig. 1 becomes punctured the drop in pressure upon its corresponding side of the piston 24 will cause the piston to be moved toward the left by reason of the excess pressure upon the opposite side thereof from the right hand tube through its duct 23 and the corresponding right hand valve 26 will close its passage 19 to seal the communication of the chamber 17 with the sound tube. By closing the stop cock 14 in the union of the defective tube the latter is closed off from the chamber 17 and it is then possible to introduce more pressure into the sound tube by a suitable pump or other injector applied to the nipple 30 as the air will not escape into the defective tube and the pressure from the pump will open the valve 26 to the sound tube and the balancing valve will be restored to its normal central or neutral position. When the defective tube is replaced by a new one its stop cock 9 may be opened and the pressure restored in the two tubes.

By my invention the pressure in the twin tubes will remain equal while they are subjected to equal external pressure, and when one of them is subjected to an increased pressure some of its air will pass to its companion to increase the pressure or resistance thereof, while in case either tube becomes defective or flat the sound tube is automatically sealed and isolated so that it may be employed until the defective tube is replaced or repaired.

I claim:—

1. In a device of the class described, the combination of a pair of collapsible tubes arranged side by side to form a wheel-tire and containing fluid under pressure, a casing having a closed chamber normally communicating with each of the tubes, valve mechanism in the casing governing the communications of the tubes with the chamber, and means in the chamber to move the valve mechanism to seal either vessel when the pressure in the other tube is reduced.

2. In a device of the class described, the combination of a pair of collapsible tubes arranged side by side to form a wheel-tire and containing fluid under pressure, a casing having a closed chamber normally communicating with the tubes, valve mechanism governing the communications of the tubes with the chamber, a piston controlling said valves, and means to move the piston to seal either tube when the pressure in the other tube is reduced.

3. In a device of the class described, the combination of a pair of collapsible tubes arranged side by side to form a wheel-tire and containing fluid under pressure, a casing having a closed chamber normally communicating with the tubes, a pair of valves governing the communications of the tubes with the chamber, a piston-chamber in the casing, a piston in the piston-chamber controlling said valves, and a duct connecting the piston-chamber on each side of the piston with one of the tubes.

4. In a device of the class described, the combination of a pair of collapsible tubes arranged side by side to form a wheel-tire and containing fluid under pressure, a casing having a central chamber and end chambers communicating with the tubes, a pair of valves governing the communications of the end chambers with the central chamber, a piston-chamber in the central chamber, a piston in the piston-chamber having stems carrying valves, and a duct connecting the piston-chamber on each side of the piston with one of the tubes.

5. In a device of the class described, a pair of collapsible tubes arranged side by side and containing air under pressure to form the tire of an automobile wheel, a casing having a closed chamber and provided with an air passage and by-pass between each tube and the chamber, valve mechanism in the casing governing said air passages, and means in the chamber to move the valve mechanism to seal either tube when the pressure in the other tube is reduced.

6. In a device of the class described, a pair of collapsible tubes arranged side by side and containing air under pressure to form the tire of an automobile wheel, a casing having a closed chamber and provided with an air passage between each tube and the chamber, a pair of valves governing said air passages, a piston-chamber having opposite ducts leading to the respective air passages, a piston in the chamber between the ducts, and means to retard the motion of the piston.

7. In a device of the class described, a pair of collapsible tubes arranged side by side and containing air under pressure to form the tire of an automobile wheel, a casing having a closed chamber and provided with an air passage between each tube and the chamber, a stop-cock in each passage, a pair of valves governing said air passages, a piston-chamber having opposite ducts leading to the respective air passages on the near side of the cocks, a piston in the chamber between the ducts, and means to produce friction on the piston.

8. In a device of the class described, the combination of a pair of collapsible tubes arranged side by side to form a wheel tire, a casing having a closed air-chamber and provided with an air pipe between each tube and the chamber, valve mechanism to seal either tube when the other is out of use, a stop-cock in each air pipe, and a valved air-inlet for the air chamber.

In testimony whereof I affix my signature in presence of two witnesses.

CHARLES D. SEEBERGER.

Witnesses:
　DORA A. SEEBERGER,
　W. E. ROGERS.